Aug. 9, 1932.  R. B. LEWIS  1,870,415
HARDNESS TESTING MACHINE
Filed June 26, 1928   2 Sheets-Sheet 1
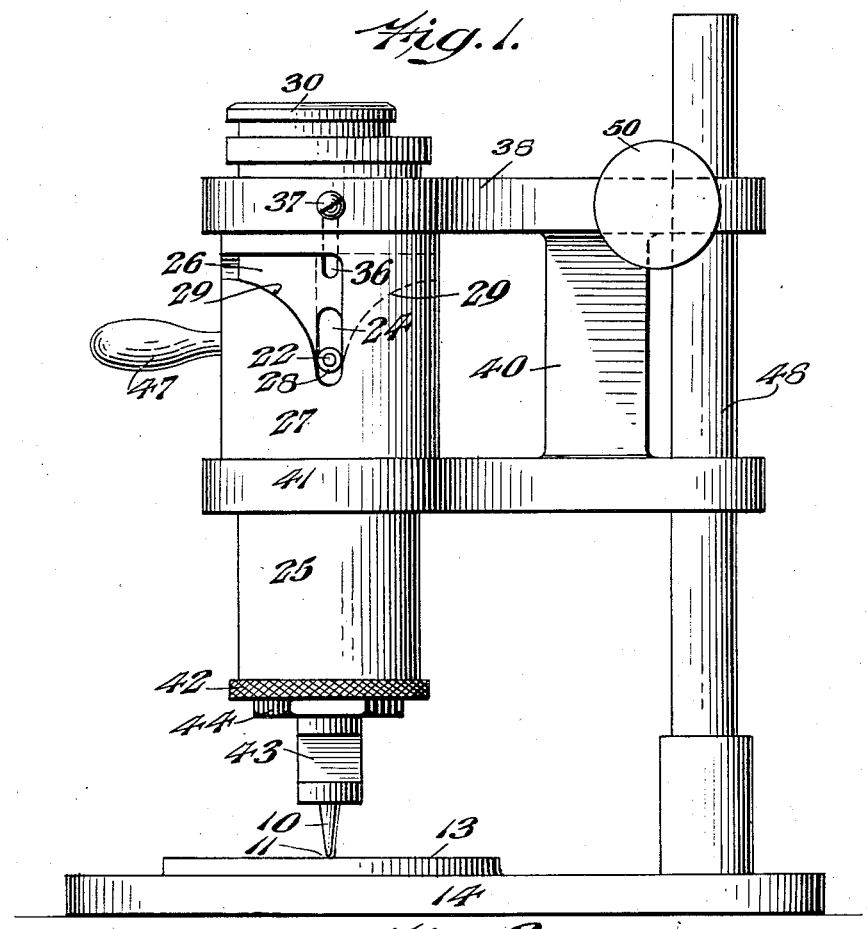
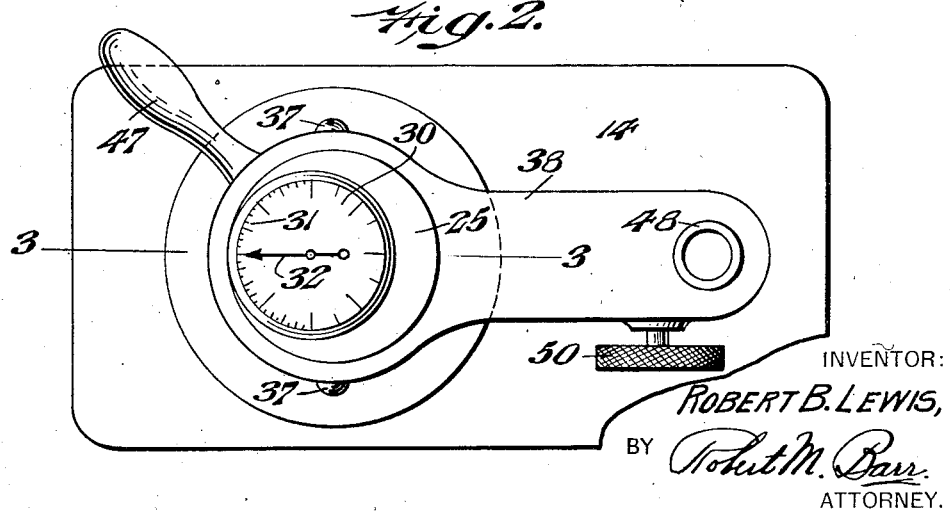
INVENTOR:
ROBERT B. LEWIS,
BY Robert M. Barr
ATTORNEY.

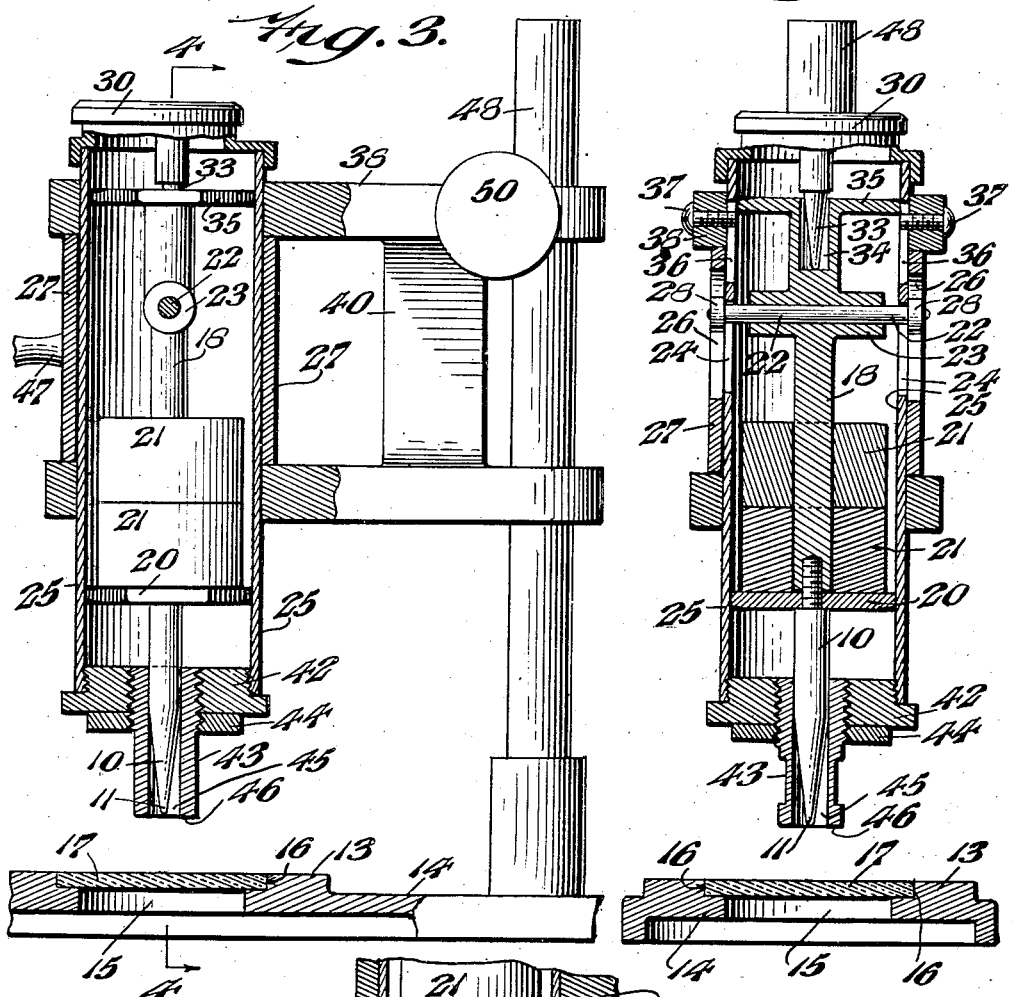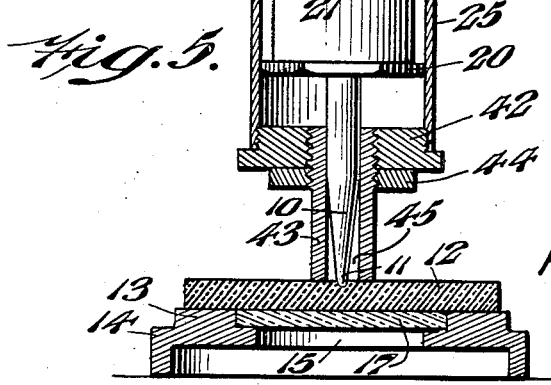

Patented Aug. 9, 1932

1,870,415

UNITED STATES PATENT OFFICE

ROBERT B. LEWIS, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA

HARDNESS TESTING MACHINE

Application filed June 26, 1928. Serial No. 288,517.

The present invention relates to testing machines and more particularly to a machine for determining the hardness of materials.

Some of the objects of the present invention are to provide an improved precision machine for determining the hardness of materials; to provide a machine which will accurately indicate and serve as a measure of the resistance of a material to the penetration of the testing element of the machine; to provide a hardness testing mechanism wherein inaccuracies between successive tests are eliminated and uniform accurate readings can be obtained as a measure of the indentation or penetration of a testing element; to provide a hardness testing machine consisting of few parts so arranged and constructed as to serve as a precise measuring means for determining the hardness of definite materials; to provide a hardness testing machine which can be adjusted to various testing positions for use with materials of different sizes and properties; and to provide other improvements as will hereinafter appear.

In the accompanying drawings, Fig. 1 represents a side elevation of a hardness testing machine embodying one form of the present invention; Fig. 2 represents a plan of the same; Fig. 3 represents a section on line 3—3 of Fig. 2; Fig. 4 represents a section on line 4—4 of Fig. 3; and Fig. 5 represents a sectional detail showing the testing position of the machine.

Referring to the drawings, one form of the present invention employs a gravity actuated penetration tester 10 formed of any suitable material of a hardness greater than that of the materials to be tested. As here shown, this tester 10 is of pointer shape terminating in a relatively small rounded end 11 for contact with the material under test, which, in this instance, is indicated as a piece of rubber 12 supported by a table 13 in the path of movement of the tester 10. This table 13 is mounted in a horizontal plane as a part of a base 14 and has an opening 15 extending through the base 14 and in alignment with the tester 10 whereby, if conditions require, the tester 10 can be passed through the opening 15 to contact with a material supported beneath the base 14. A counter-bore 16 encircles the opening 15 and is arranged to form a seat for a disc 17 of glass or other material chosen as the unit of measure and from which the machine can be set to its zero position by carrying out certain initial adjustments.

For controlling the operation of the tester 10, it is attached to and forms an axial continuation of a spindle 18 which carries a support disc 20 to receive a removable weight or weights 21 whereby the pressure of the tester 10 upon a material is predetermined and constant. In the present construction, the weights 21 are apertured for the passage of the spindle 18 and can be removed and replaced by disconnecting the disc 20 and tester 10, since the preferred arrangement is to thread the tester into the spindle 18 and thus clamp the disc 20 in place. The spindle 18 is arranged to be lifted and held against the action of gravity by a pin 22 which fits snugly in the bore of a head 23, formed on the spindle 18, and has its ends projecting respectively through slots 24 provided in a reciprocable sleeve 25, and also through cam slots 26 in a rotatably mounted tubular casing 27. This slotted construction permits the desired lost motion connection between the sleeve 25 and the spindle 18. The ends of the pin 22 are respectively provided with rollers 28 in order to facilitate easy movement when the pin 22 is actuated by the cam action of the casing 27. The cam slots 26 are each formed with a lower cam surface 29 upon which the respective rollers 28 ride to lift the spindle 18 when the casing 27 is turned in one direction and to allow the spindle to lower by gravity action when the casings 27 is turned in the opposite direction.

To measure the movement of the tester 10, the sleeve 25 carries an indicating gage 30 having a scale 31 preferably graduated in thousandths of an inch and also having an index 32 arranged to be rotated by a pressure actuated plunger 33 projecting axially into the sleeve 25 and entering an axially located socket 34 provided in the upper end of the spindle 18. As here shown a disc 35 encircles the socket portion of the spindle 18 and serves as a guide to maintain the spindle accurately centered within the sleeve 25. This sleeve 25 is freely reciprocable in the casing 27 but is prevented from relative rotary movement by slots 36 which respectively receive the ends of stud screws 37 passing through the upper arm 38 of a bracket 40. This arm 38 is apertured to form a guide for the vertical sleeve 25, while a similarly apertured lower arm 41 of the bracket 40 performs the same function for the lower end of the sleeve 25. The closer cap 42 closes the lower end of the sleeve 25 and has an axially located reference block 43 threaded into it and held in any adjusted position by a locking nut 44. The block 43 is provided with an axial bore 45 through which the tester 10 is free to move for contact with the material to be tested, and also is provided with a plane contact face 46 to seat upon the surface of the material. Since the gage 30 is carried by the sleeve 25 and the tester 10 is associated with the spindle 18 which engages the movable element of the gage 30, any relative movement between the sleeve 25 and the tester 10 will be at once indicated by the gage 30. The sleeve 25, gage 30, cap 42, and block 43 form broadly a gage unit.

For mounting and actuating the casing 27, it is mounted for free turning movement between the upper and lower arms 38 and 41 of the bracket 40 and carries a laterally projecting handle 47 for manually swinging it from one position to another. The bracket 40 is arranged to raise and lower the casing 27 and its associated parts by mounting it upon a post 48, upstanding from the base 14, and to which it can be rigidly fixed in any adjusted position by a clamping screw 50.

In order to set the machine to zero, the clamping screw 50 is loosened and the bracket 40 is moved to a position where the face 46 of the block 43 is in contact with the glass disc 17. This movement takes place when the casing 27 is turned to a position where the tester 10 is unsupported by the cam 29, and after the block 43 is located as above described the bracket is again clamped to its post 48. In this position, the tester 10 is held up by the disc 17 and its end 11 lies in the plane of the block face 46, thus giving relation between the tester 10 and the associated parts of the reference block 43 for the zero reading of the index 32. If the gage index 32 does not register the zero position, the two movable parts are not properly adjusted for test purposes and it is then necessary to raise or lower the sleeve 25 by turning the reference block 43 in the proper direction to bring the index 32 of the gage 30 to the zero position. The machine is now ready for test purposes.

For testing the hardness of any material, such as the sample of rubber 12, the handle 47 is turned so that the casing cam surfaces 29 acting through the pin 22 lift the tester 10 and the sleeve 25 and hold them interlocked. The bracket 40 is now adjusted and locked upon the post 48 in such a position that when the casing 27 is turned to lower the pin 22 both the block face 46 and the tester 10 will rest upon the material under test. In making this adjustment of the bracket 40, care should be taken that its set position is such that the sleeve 25 is free to move relative to the casing 27 as otherwise the relative movement of the tester 10 will not cause a true indication upon the gage 30. The test may then be made by turning the handle 47 so that the casing 27 moves its cam faces 29 in the direction to lower the reference block 43 and the tester 10 until the face of the former seats upon the rubber 12 or other material and the tester 10 rests solely thereon under the gravity action of the weights 21. The result is a movement downward of the tester 10 relative to the sleeve 25 as the tester 10 penetrates the material and in consequence the index 32 swings to a place on the scale 31 corresponding in thousandths of an inch to the degree of penetration of the tester 10 into the material under test. The penetration test period is relatively short and for general purposes is taken as four seconds, as otherwise a material fatigue factor enters which prevents accurate determination of the natural hardness of the material.

It will now be apparent that a complete unitary hardness testing machine has been devised which is simple in construction, precise in measurement, and not dependent in any way upon springs or error introducing factors. Furthermore, one setting of the tester results in a direct reading upon the indicator, and hence differentiates from those machines which require position settings and a skilled operator to obtain the desired measure of the hardness of a material.

Having thus described my invention, I claim:

1. A hardness testing machine comprising a vertically movable spindle terminating in a penetration tester, a sleeve encircling said spindle and having lost motion connection therewith to provide limited relative motion between said parts, a gage movable with said sleeve and actuated by the movement of said spindle, a material contact element carried by said sleeve, means for bringing said contact element and said penetration tester simultaneously into contact with the material under test, and weight means acting upon said spindle to produce a penetration movement relative to said contact element whereby said gage is actuated as a measure of the penetration.

2. A hardness testing machine comprising a weighted vertically movable spindle terminating in a penetration tester, a sleeve encircling said spindle and having lost motion connection therewith to provide limited relative motion between said parts, a rotatable casing about said sleeve, means including cam faces on said casing for raising and lowering said spindle, a gage movable with said sleeve and actuated by the movement of said spindle, means controlled by said spindle for actuating said gage, and an adjustable support for said casing and sleeve.

3. A hardness testing machine comprising a support for a material under test, a penetration tester weighted to penetrate said material, a tubular member about said tester and vertically movable relative thereto, and means operable when said tester and member are in contact with said material for indicating the movement of said tester with respect to said member whereby the depth of penetration is accurately measured.

Signed at Philadelphia, county of Philadelphia, State of Pennsylvania, this 13th day of June, 1928.

ROBERT B. LEWIS.